United States Patent
Yamamoto et al.

(10) Patent No.: US 8,812,521 B2
(45) Date of Patent: Aug. 19, 2014

(54) IMAGE FILE SORTING METHOD, IMAGE FILE SORTING DEVICE, AND COMPUTER PROGRAM PRODUCT

(75) Inventors: Hidenori Yamamoto, Ishikawa (JP); Koichi Kitagawa, Ishikawa (JP); Yasunori Taniguchi, Ishikawa (JP); Kiyoto Kosaka, Ishikawa (JP); Satoshi Kubo, Ishikawa (JP)

(73) Assignee: PFU Limited, Ishikawa (JP)

( * ) Notice: Subject to any disclaimer, the term of this patent is extended or adjusted under 35 U.S.C. 154(b) by 679 days.

(21) Appl. No.: 12/239,463

(22) Filed: Sep. 26, 2008

(65) Prior Publication Data

US 2009/0216721 A1    Aug. 27, 2009

(30) Foreign Application Priority Data

Feb. 27, 2008    (JP) .................................. 2008-046803

(51) Int. Cl.
*G06F 17/30*    (2006.01)
*G06K 9/20*    (2006.01)

(52) U.S. Cl.
CPC ........ *G06F 17/30253* (2013.01); *G06K 9/2063* (2013.01)
USPC ............................ 707/752; 707/741; 707/748

(58) Field of Classification Search
None
See application file for complete search history.

(56) References Cited

U.S. PATENT DOCUMENTS

| | | | | |
|---|---|---|---|---|
| 5,878,410 A | * | 3/1999 | Zbikowski et al. ................... | 1/1 |
| 2001/0041006 A1 | * | 11/2001 | Katsuyama ................... | 382/190 |
| 2003/0174907 A1 | * | 9/2003 | Kanemoto et al. ............ | 382/309 |
| 2003/0218642 A1 | * | 11/2003 | Sakayori et al. .............. | 345/853 |
| 2005/0180660 A1 | * | 8/2005 | Hu et al. ........................ | 382/309 |
| 2005/0213810 A1 | * | 9/2005 | Sabe et al. .................... | 382/159 |
| 2007/0276828 A1 | * | 11/2007 | Au et al. .......................... | 707/7 |
| 2008/0133411 A1 | * | 6/2008 | Jones et al. ..................... | 705/42 |
| 2008/0199082 A1 | * | 8/2008 | Tanaka et al. ................. | 382/199 |
| 2009/0092317 A1 | * | 4/2009 | Nagarajan et al. ............ | 382/173 |
| 2009/0182739 A1 | * | 7/2009 | Crockett et al. .................. | 707/6 |

FOREIGN PATENT DOCUMENTS

| | | |
|---|---|---|
| JP | 06052236 | 2/1994 |
| JP | 09190447 | 7/1997 |
| JP | 11-238072 A | 8/1999 |
| JP | 2004078343 | 3/2004 |

(Continued)

OTHER PUBLICATIONS

Ramana Rao et al., "Protofoil: Storing and Finding the Information Worker's Paper Documents in an Electronic File Cabinet", Human Factors in Computing Systems, CHI '94, "Celebrating Interdependence".

(Continued)

*Primary Examiner* — Mohammad S Rostami
(74) *Attorney, Agent, or Firm* — Lowe Hauptman & Ham, LLP

(57) ABSTRACT

An image file sorting method is executed by an image file sorting device, including a storage unit, a control unit, and an image reading unit, wherein the storage unit includes a sorting condition storage unit that stores a sorting condition to specify a sorting destination of an image file. The method includes a sorting keyword extracting step of extracting a sorting keyword from a marker portion of the image file read by the image reading unit, a sorting destination deciding step of deciding the sorting destination of the image file by collating the sorting keyword extracted by the sorting keyword extracting step and the sorting condition stored in the storing condition storage unit, and an image file sorting step of sorting the image file into the sorting destination decided by the sorting destination deciding step.

15 Claims, 5 Drawing Sheets

(56) References Cited

FOREIGN PATENT DOCUMENTS

| | | |
|---|---|---|
| JP | 2004214731 A | 7/2004 |
| JP | 2007148544 | 6/2007 |
| JP | 2007219682 | 8/2007 |

OTHER PUBLICATIONS

DE Office Action dated Mar. 6, 2009.

Japanese Office Action for Application No. 2008-046803 mailed Jul. 10, 2012.

Final Office Action issued by the Japanese Patent Office on Oct. 9, 2012 in corresponding Application No. JP-2008-046803, with English translation.

Hata, Yoichiro,: "Day Three, E-Mail 'Sylpheed' High-Performance and Esay-To-Use E-mail Client", Journal Title: Nikkei Linux, Published Aug. 8, 2003, Fifth Edition, vol. 9, pp. 107-109, with English translation.

\* cited by examiner

FIG.3

| NO. | PRIORITY | LEVEL | CONDITION | VALUE | COLOR | COUPLING CONDITION | PROPERTY | SORTING DESTINATION |
|---|---|---|---|---|---|---|---|---|
| 1 | 3 | 1 | CHARACTER | INVOICE | (OPTIONAL) | (UNNECESSARY) | (NONE) | FOLDER A |
| 2 | 1 | 1 | CHARACTER | RECEIPT | YELLOW | (UNNECESSARY) | TITLE | FOLDER B |
| 3 | 2 | 1 | CHARACTER | RECEIPT | RED | (UNNECESSARY) | COMPOSER | FOLDER C |
| 4 | 4 | 1 | CHARACTER | ORDER FORM | BLUE | AND | KEYWORD | FOLDER D |
| | | 2 | CHARACTER | XX TRADING COMPANY | GREEN | OR | KEYWORD | |
| | | 2 | CHARACTER | YY TRADING COMPANY | GREEN | (UNNECESSARY) | KEYWORD | |
| 5 | 5 | 1 | SHAPE | ○ | YELLOW | (UNNECESSARY) | (NONE) | FOLDER E |
| 6 | 6 | 1 | COORDINATE | X:100, Y:100 | BLUE | (UNNECESSARY) | (NONE) | FOLDER E |
| 7 | 7 | 1 | RULED LINE | DOTTED LINE | GREEN | (UNNECESSARY) | (NONE) | FOLDER F |

FIG.4A

| NO. | PRIORITY LEVEL | CONDITION | VALUE | COLOR | COUPLING CONDITION | PROPERTY | SORTING DESTINATION |
|---|---|---|---|---|---|---|---|
| 1 | 1 | CHARACTER | INVOICE | (OPTIONAL) | (UNNECESSARY) | TITLE | FOLDER A |

FIG.4B

| NO. | PRIORITY LEVEL | CONDITION | VALUE | COLOR | COUPLING CONDITION | PROPERTY | SORTING DESTINATION |
|---|---|---|---|---|---|---|---|
| 1 | 1 | CHARACTER | ORDER FORM | (OPTIONAL) | AND | KEYWORD | FOLDER D |
| | 1 | CHARACTER | XX TRADING COMPANY | (OPTIONAL) | | KEYWORD | |

IMAGE FILE SORTING METHOD, IMAGE FILE SORTING DEVICE, AND COMPUTER PROGRAM PRODUCT

RELATED APPLICATIONS

The present application is based on, and claims priority from, Japan Application Number 2008-046803, filed Feb. 27, 2008, the disclosure of which is hereby incorporated by reference herein in its entirety.

BACKGROUND OF THE INVENTION

1. Field of the Invention

The present invention relates to an image file sorting method, an image file sorting device, and a computer program product.

2. Description of the Related Art

Conventionally, there has been a method to input a keyword to image data read by a scanner or the like to associate the same so as to enhance the convenience at the time of search or the like.

For example, there are the methods in which (1) a user manually inputs the keyword, and (2) a character string recognized in an image range specified by a mouse is set as the keyword.

In the technique disclosed in JP-A-11-238072, the keyword is extracted from a full-text recognized document by indexing.

However, in the conventional keyword input methods (1) and (2), there has been a problem that the user has to manually specify the keyword and the keyword extracting range when saving the image file.

In the conventional technique disclosed in JP-A-11-238072, although an automatic keyword extraction is possible, sometimes the keyword is not correctly extracted, so that there has been a problem of low accuracy.

SUMMARY OF THE INVENTION

It is an object of the present invention to at least partially solve the problems in the conventional technology.

An image file sorting method according to one aspect of the present invention is executed by an image file sorting device, including a storage unit, a control unit, and an image reading unit, wherein the storage unit includes a sorting condition storage unit that stores a sorting condition to specify a sorting destination of an image file. The method includes a sorting keyword extracting step of extracting a sorting keyword from a marker portion of the image file read by the image reading unit a sorting destination deciding step of deciding the sorting destination of the image file by collating the sorting keyword extracted by the sorting keyword extracting step and the sorting condition stored in the storing condition storage unit; and an image file sorting step of sorting the image file into the sorting destination decided by the sorting destination deciding step.

An image file sorting device according to another aspect of the present invention includes a storage unit, a control unit, and an image reading unit, wherein the storage unit includes a sorting condition storage unit that stores a sorting condition to specify a sorting destination of an image file. The control unit includes a sorting keyword extracting unit that extracts a sorting keyword from a marker portion of the image file read by the image reading unit, a sorting destination deciding unit that decides the sorting destination of the image file by collating the sorting keyword extracted by the sorting keyword extracting unit and the sorting condition stored in the storing condition storage unit, and an image file sorting unit that sorts the image file into the sorting destination decided by the sorting destination deciding unit.

A computer program product according to still another aspect of the present invention includes a computer readable medium including programmed instructions for executing an image file sorting method by an image file sorting device. The image file sorting device includes a storage unit, a control unit, and an image reading unit, wherein the storage unit includes a sorting condition storage unit that stores a sorting condition to specify a sorting destination of an image file. The instructions, when executed by a computer, cause the computer to perform a sorting keyword extracting step of extracting a sorting keyword from a marker portion of the image file read by the image reading unit, a sorting destination deciding step of deciding the sorting destination of the image file by collating the sorting keyword extracted by the sorting keyword extracting step and the sorting condition stored in the storing condition storage unit, and an image file sorting step of sorting the image file into the sorting destination decided by the sorting destination deciding step.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a view showing one example of a sorting condition table according to an embodiment in the present invention;

FIGS. 4A and 4B are views showing one example of sorting condition generation according to the embodiment.

DETAILED DESCRIPTION OF THE PREFERRED EMBODIMENTS

The following describes an embodiment of an image file sorting method, and an image file sorting device for such a method and a device according to the present invention in detail with reference to the drawings. The embodiment is illustrative only, and is not intended to limit the present invention in any way.

Overview of the Invention

Figure 1:
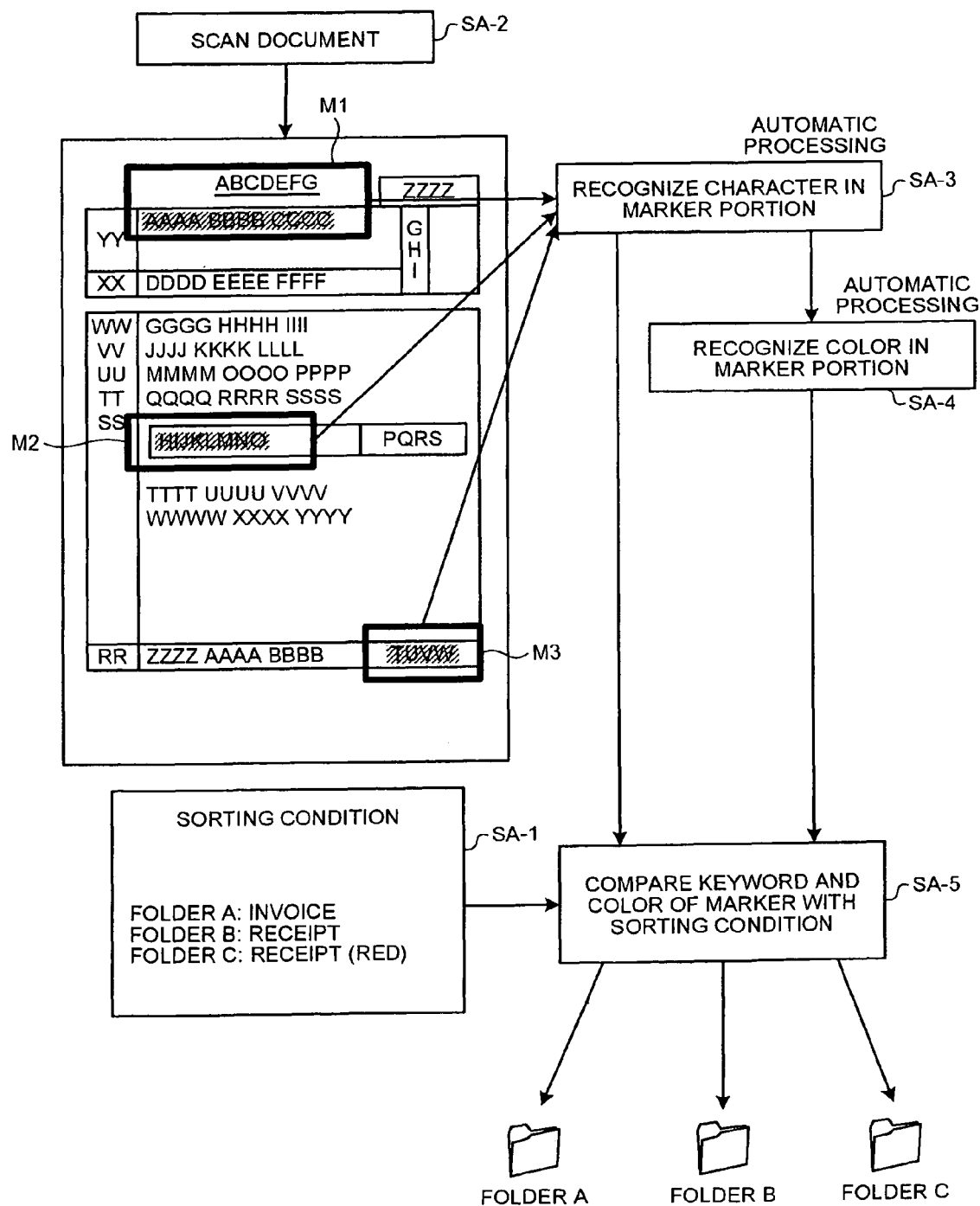
FIG. 1 is a flowchart showing a basic principle of the present invention.

The following first outlines the present invention, and then, a configuration and processing of the present invention are explained in detail. FIG. 1 is a flowchart showing a basic principle of the present invention.

In general, the present invention has the following basic characteristic. That is to say, the present invention is provided with a storage unit, a control unit, and an image reading unit, and the storage unit stores a sorting condition to specify a sorting destination of an image file (step SA-1). The "sorting condition" specifies the sorting destination of the image file, and associates property information, a character, a color, a shape, a coordinate, or a type of ruled line with the sorting destination to store the same as the sorting condition. In FIG.

1, the sorting condition is set, for example, to sort into a "folder A" when a sorting keyword is "invoice", to sort into a "folder B" when the sorting keyword is "receipt", and to sort into a "folder C" when the sorting keyword is "receipt" and the color of a marker is "red".

The present invention may generate the sorting condition based on the property information of the sorted image file and store the same in the storage unit. The "property information" is the information describing a format item indicating an attribute, characteristics, properties, condition or the like of the file, and includes a title, a keyword, an extension, a storing space, an intended purpose, a color, a size, a type (such as image, photograph, music, moving image), an updated date, access right, date and time (such as updated date and time, created date and time), the attribute, an owner, and a composer of the file, for example, but this is not limited to them.

The present invention reads the image file (for example, a document file) by the image reading unit (for example, a scanner) (step SA-2), and extracts the sorting keyword from marker portion (refer to M1 to M3 in FIG. 1) of a read image file. The "marker portion" is an area on the image file specified by a user with a marker, and is the area specified (for example, by marking out the character, encircling the character, underlining the character) with the marker of semi-translucent colors (such as fluorescent pink, fluorescent green, fluorescent yellow, fluorescent blue), as shown in FIG. 1, for example.

At a sorting keyword extracting step of a step SA-3, the present invention may recognize the character in the marker portion and set the character as the sorting keyword (step SA-3), or may recognize the color of the marker portion and set the color as the sorting keyword (step SA-4). Although not shown in FIG. 1, it is possible to recognize the shape of the marker portion and set the shape as the sorting keyword, to recognize the coordinate of the marker portion on the image file and set the coordinate as the sorting keyword, and to recognize the type of ruled line drawn in the marker portion and set the type of ruled line as the sorting keyword. The present invention may associate the sorting keyword extracted at the sorting keyword extracting step with the image file to store the same in the storage unit.

The present invention decides the sorting destination of the image file by collating the extracted sorting keyword and the sorting condition stored in the storage unit (step SA-5).

The present invention sorts the image file into a decided sorting destination (for example, the folder A, the folder B, or the folder C in FIG. 1) (step SA-6).

Configuration of the Image File Sorting Device

Figure 2:
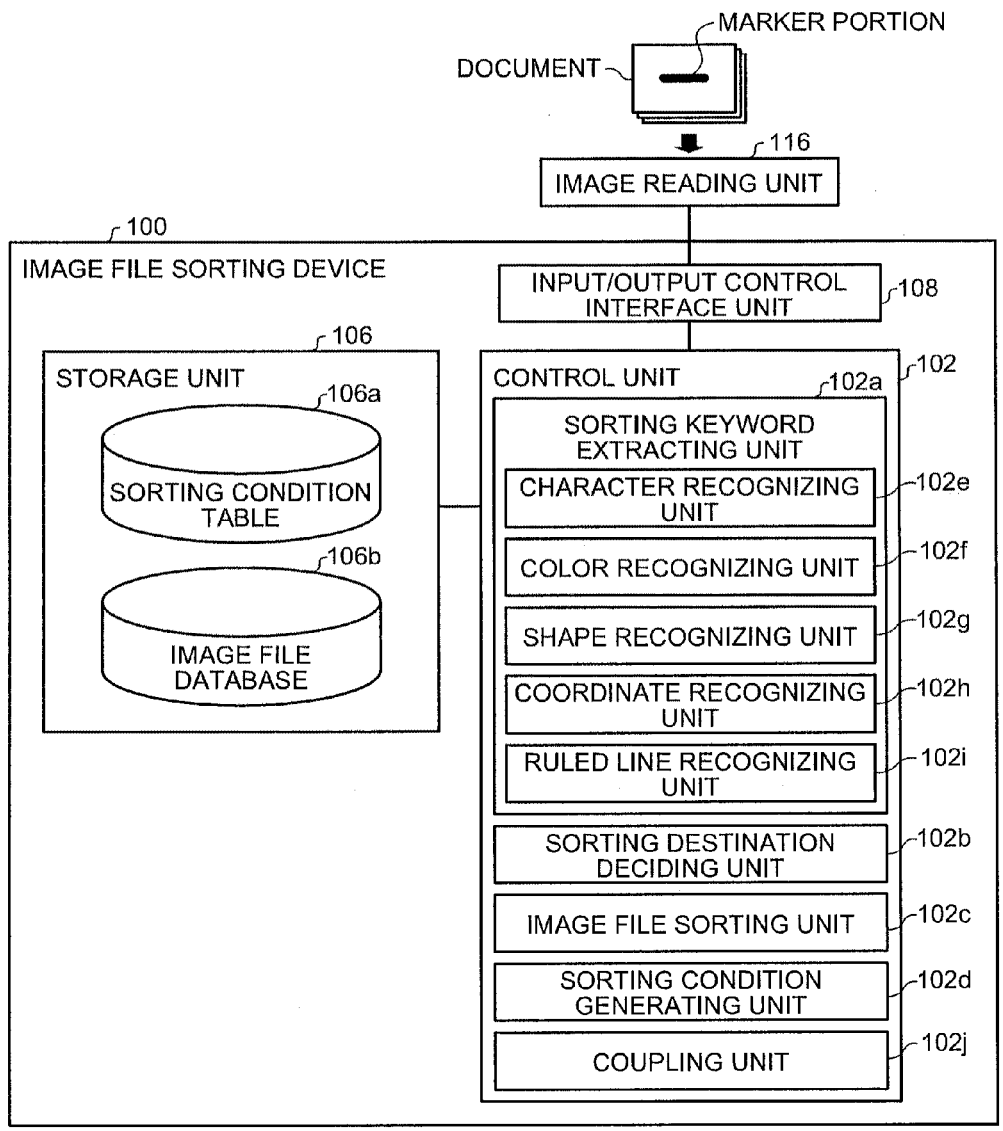
FIG. 2 is a block diagram showing one example of a configuration of an image file sorting device to which the present invention is applied.

The following first describes a configuration of an image file sorting device 100. FIG. 2 conceptually shows only parts related to the present invention.

In FIG. 2, in general, an image file sorting device 100 is provided with includes a control unit 102 such as a CPU that integrally controls an entire image file sorting device 100, an input/output control interface unit 108 connected to an input unit (not shown), an output unit (not shown) and an image reading unit 116, and a storage unit 106 that stores various databases and tables, and the units are communicably connected through an optional communication channel.

The various databases and tables (a sorting condition table 106a and an image file database 106b) stored in the storage unit 106 are the storage units such as a fixed disk drive and store various programs used in various processing, tables, image files, databases, folders or the like.

The sorting condition table 106a, out of various components of the storage unit 106 stores the sorting condition that specifies the sorting destination of the image file. The "sorting condition" is the sorting condition that specifies the sorting destination of the image file, and it is possible to associate the property information, the character, the color, the shape, the coordinate, or the type of ruled line with the sorting destination and store the same as the storing condition.

As shown in FIG. 3, for example, "No.", "priority", "level", "condition", "value", "color", "coupling condition", "property" and "sorting destination" are specified in the sorting condition table 106a. "No." specifies a unique number. "Priority" specifies application priority of the condition. "Level" specifies an effective level of the condition, and in an example No. 4 in FIG. 3, this is {order form [blue] AND (XX trading company [green] OR YY trading company [green])}. "Condition" and "value" specify recognizing condition of the marker portion and a condition value, and for example, character=recognized character string, shape=shape of the marker (such as round, triangle, square, star), coordinate=coordinate of the marker portion, ruled line=type of ruled line (such as solid line and broken line). "Coupling condition" is the condition to combine a plurality of conditions, values, and colors, and there are AND and OR as options, for example. "Property" specifies to which property information of the scanned image file, a marker-recognized character string is set, and there are, for example, the title, the composer, a subtitle, the keyword as options. The "sorting destination" specifies a folder name of the sorting destination.

Referring again to FIG. 2, the image file database 106b stores the image file with which the sorting keyword is associated by a coupling unit 102j to be explained later, and stores the image file sorted by an image file sorting unit 102c to be explained later.

In FIG. 2, the input/output control interface unit 108 controls the input unit, the output unit, and the image reading unit 116. The image reading unit 116 is the scanner, for example, and is capable of reading the image data from a document. A monitor (including a home television) may be used as the output unit (hereinafter, the output unit is sometimes referred to as the monitor). A keyboard, a mouse, a microphone and the like may be used as the input unit.

In FIG. 2, the control unit 102 includes an internal memory for storing a control program such as an Operating System (OS), a program that defines various procedures, and required data, and performs information processing for executing various processes using such programs. The control unit 102 is functionally conceptually provided with a sorting keyword extracting unit 102a, a sorting destination deciding unit 102b, an image file sorting unit 102c, a sorting condition generating unit 102d, and a coupling unit 102j.

The sorting keyword extracting unit 102a extracts the sorting keyword from the marker portion of the image file read by the image reading unit 116. The "marker portion" is the area on the image file specified by the user with the marker.

The sorting keyword extracting unit 102a may be provided with a character recognizing unit 102e, a color recognizing unit 102f, a shape recognizing unit 102g, a coordinate recognizing unit 102h, and a ruled line recognizing unit 102i. The character recognizing unit 102e recognizes the character in the marker portion to set the character as the sorting keyword. The color recognizing unit 102f recognizes the color of the marker portion to set the color as the sorting keyword. The shape recognizing unit 102g recognizes the shape of the marker portion to set the shape as the sorting keyword. The coordinate recognizing unit 102h recognizes the coordinate of the marker portion on the image file to set the coordinate as the sorting keyword. The ruled line recognizing unit 102i recognizes the type of ruled line drawn in the marker portion to set the type of ruled line as the sorting keyword.

The sorting destination deciding unit 102*b* decides the sorting destination of the image file in the image file database 106*b* by collating the sorting keyword extracted by the sorting keyword extracting unit 102*a* and the sorting condition stored in the sorting condition table 106*a* of the storage unit 106.

The image file sorting unit 102*c* sorts the image file to the sorting destination in the image file database 106*b* of the storage unit 106 decided by the sorting destination deciding unit 102*b*.

The sorting condition generating unit 102*d* generates the sorting condition based on the property information of the image file sorted by the image file sorting unit 102*c* to store the same in the sorting condition table 106*a* of the storage unit 106.

An automatic generating function of the sorting condition of the sorting condition generating unit 102*d* is explained with reference to FIGS. 4A and 4B. FIG. 4A is a view showing one example of data of the sorting condition table automatically generated by the sorting condition generating unit 102*d* when the sorted image file is in the folder A and the title of the property information of the image file is set as "invoice". For example, in FIG. 4A, since a title field of the property information of the image file sorted into the folder A is set as "invoice", the sorting condition generating unit 102*d* sets the property of the sorting condition table as the title and sets the value as the invoice. FIG. 4B is a view showing one example of data of the sorting condition table automatically generated by the sorting condition generating unit 102*d* when the sorted image file is in the folder D and the keyword of the property information of the image file is set as "order form" and "XX trading company". For example, in FIG. 4B, since the keyword field of the property information of the image file sorted into the folder D is set as "order form" and "XX trading company", the sorting condition generating unit 102*d* sets the property of the sorting condition table as the keyword and sets the values as the order form and the XX trading company. In FIGS. 4A and 4B, items automatically generated by the sorting condition generating unit 102*d* are "No., priority, level, condition, value, coupling condition, property, and sorting destination" and items to be added or changed by the user as needed are "priority and color".

The coupling unit 102*j* associates the sorting keyword extracted by the sorting keyword extracting unit 102*a* with the image file to store the same in the image file database 106*b*.

Referring again to FIG. 2, the image file sorting device 100 may be communicably connected to a network (not shown) through a communication control interface unit (not shown) connected to a communication device such as a router and a wired or wireless communication line such as a dedicated line. That is to say, the communication control interface unit (not shown) may have the function to communicate data with another terminal through the communication line. The network has the function to connect the image file sorting device 100 and an external device (not shown), and this may be an Internet, a telephone network (including a mobile phone network, a fixed-line telephone network, or the like), and an intranet.

Processing of Image File Sorting

Figure 5:
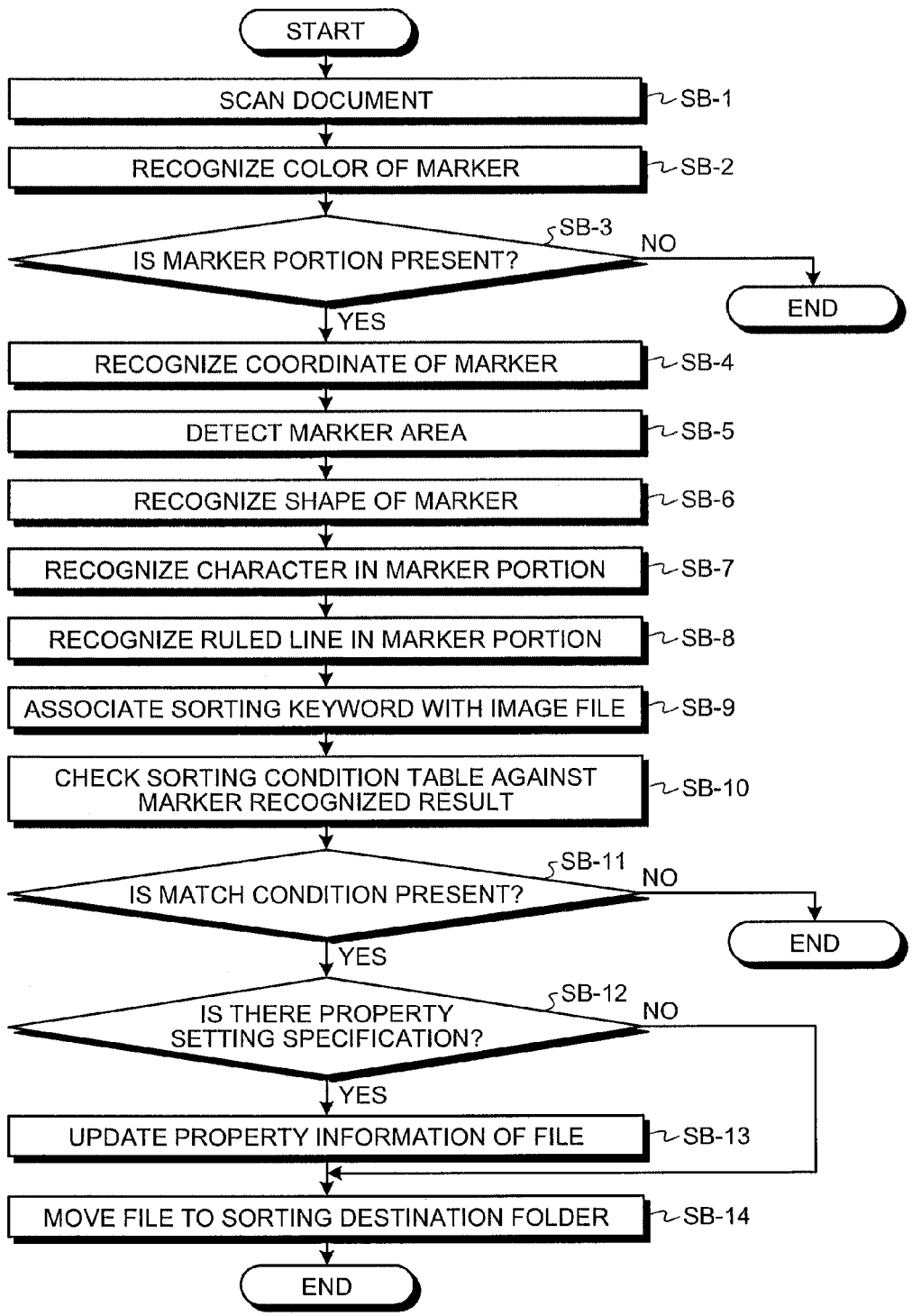
FIG. 5 is a flowchart showing one example of process of an image file sorting device according to the embodiment.

The following describes in detail one example of processing of the image file sorting device 100 according to the present embodiment as configured above with reference to FIG. 5.

First, the control unit 102 controls the image reading unit 116 to read the image file from the document by the image reading unit 116 (step SB-1).

Then the sorting keyword extracting unit 102*a* controls the image reading unit 116 by the process of the control unit 102 to extract the sorting keyword from the marker portion of the image file read from the document (steps SB-2 to SB-8). Subsequently, the process at each of the steps SB-2 to SB-8 will be explained.

The color recognizing unit 102*f* recognizes the color of the marker portion (step SB-2) and judges whether the marker portion is present based on whether the color recognizing unit 102*f* has recognized the color of the marker portion (step SB-3). The color recognizing unit 102*f* proceeds to the process of a step SB-4 when it is judged that the marker portion is present (step SB-3: Yes). On the other hand, when it is judged that the marker portion is not present (step SB-3: No), the process is ended. The sorting keyword extracting unit 102*a* may set the color recognized by the process of the color recognizing unit 102*f* as the sorting keyword.

The coordinate recognizing unit 102*h* recognizes the coordinate of the marker portion on the image file (step SB-4). The sorting keyword extracting unit 102*a* may set the coordinate recognized by the process of the coordinate recognizing unit 102*h* as the sorting keyword.

The control unit 102 detects a marker area and distinguishes a range on which the marker is drawn on the image file (step SB-5). A recognition process of the character and the ruled line to be explained later is performed in the detected marker area.

The shape recognizing unit 102*g* recognizes the shape of the marker portion (step SB-6). The sorting keyword extracting unit 102*a* may set the shape recognized by the process of the shape recognizing unit 102*g* as the sorting keyword.

The character recognizing unit 102*e* recognizes the character in the marker portion (step SB-7). The sorting keyword extracting unit 102*a* may set the character recognized by the process of the character recognizing unit 102*e* as the sorting keyword.

The ruled line recognizing unit 102*i* recognizes the type of ruled line drawn in the marker portion (step SB-8). The sorting keyword extracting unit 102*a* may set the type of ruled line recognized by the process of the ruled line recognizing unit 102*i* as the sorting keyword.

The coupling unit 102*j* associates the sorting keyword extracted by the sorting keyword extracting unit 102*a* with the image file and stores the same in the image file database 106*b* (step SB-9).

The sorting destination deciding unit 102*b* decides the sorting destination of the image file by collating the sorting keyword extracted by the process of the sorting keyword extracting unit 102*a* (including the character recognizing unit 102*e* to the ruled line recognizing unit 102*i*) and the sorting condition stored in the sorting condition table 106*a* of the storage unit 106 (steps SB-10 to SB-13). Subsequently, process of each of the steps SB-10 to SB-13 will be explained. The sorting condition may be generated by the sorting condition generating unit 102*d* based on the property information of the image file sorted by the process of the image file sorting unit 102*c*.

The sorting destination deciding unit 102*b* judges whether a matching condition is present based on a result of collating the sorting keyword and the sorting condition stored in the sorting condition table 106*a* at the step SB-10 (step SB-11), and when the matching condition is present (step SB-11: Yes), proceeds to a next process, and when the matching condition is not present (step SB-11: No), ends the process.

The sorting destination deciding unit 102*b* judges whether any item is specified in the property information setting of the image file (step SB-12) when the matching condition is present (step SB-11: Yes), and directly proceeds to the process of the step SB-13 when there is specification in the property information (step SB-12: Yes), and proceeds to the process of the step SB-14 when there is no specification in the property information (step SB-12: No).

When there is the specification in the property information (step SB-12: Yes), the sorting destination deciding unit 102*b* updates items specified in the property information of the image file so as to maintain consistency with the item of the sorting condition stored in the sorting condition table 106*a* (step SB-13).

The image file sorting unit 102*c* sorts the image file to the sorting destination decided by the process of the sorting destination deciding unit 102*b* (step SB-14).

Other Embodiments

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

For example, in the embodiment, the image file sorting device 100 performs various processes as a stand-alone device. However, the image file sorting device 100 can be configured to perform processes in response to request from a client terminal, which is a separate unit, and return the process results to the client terminal.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the image file sorting device 100 are merely conceptual and may not necessarily physically resemble the structures shown in the drawings. For instance, the apparatus need not necessarily have the structure that is illustrated.

For example, the process functions performed by each device of the image file sorting device 100, especially the each process function performed by the control unit 102, can be entirely or partially realized by a central processing unit (CPU) and a computer program executed by the CPU or by a hardware using wired logic. The computer program, recorded on a recording medium to be described later, can be mechanically read by the image file sorting device 100 as the situation demands. In other words, the storage unit 106 such as read-only memory (ROM) or hard disk (HD) stores the computer program that can work in coordination with the operating system (OS) to issue commands to the CPU and cause the CPU to perform various processes. The computer program is first loaded to the random access memory (RAM), and forms a control unit in collaboration with the CPU.

Alternatively, the computer program can be stored in any application program server connected to the image file sorting device 100 via the network, and can be fully or partially loaded as the situation demands.

The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks such as local area network (LAN), wide area network (WAN), and the Internet.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

The storage unit 106 is a fixed disk device such as RAM, ROM, and hard disk or flexible disk, optical disk, and stores therein various programs, tables, databases (such as the sorting condition table 106*a* and the image file database 106*b*), and files required for various processes.

The image file sorting device 100 can also be connected to any existing personal computer, workstation, etc. and can be operated by executing software (that includes computer program, data, etc.) that implements the method according to the present invention in the personal computer or workstation.

The distribution and integration of the device are not limited to those illustrated in the figures. The device as a whole or in parts can be functionally or physically distributed or integrated in an arbitrary unit according to various attachments or how the device is to be used.

According to the present invention, the image file read by the scanner or the like may be automatically move to a specific folder based on contents written in the document or the like, and as a result, there is an effect that manual image file sorting operation is reduced, accuracy of the keyword extraction is improved, and the image file may be sorted based on the extracted keyword.

According to the present invention, it is possible to search the image file later based on the sorting keyword.

According to the present invention, it is possible to automatically generate the sorting condition based on the condition of the sorted image file, thereby simplifying the setting operation of the sorting condition.

According to the present invention, it is possible to sort the image file based on the character in the marker portion.

According to the present invention, it is possible to sort the image file based on the color of the marker portion.

According to the present invention, it is possible to sort the image file based on the shape of the marker portion.

According to the present invention, it is possible to sort the image file based on the coordinate of the marker portion on the image file.

According to the present invention, it is possible to sort the image file based on the type of ruled line drawn in the marker portion.

According to the present invention, it is possible to decide the sorting destination by collating the sorting keyword and the sorting condition.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image file sorting method executed by an image file sorting device, wherein
the image file sorting device includes a storage unit, a control unit, and an image reading unit, and
the storage unit includes a sorting condition storage unit that stores, as a sorting condition to specify a sorting destination of an image file, a type of border line including solid line and broken line drawn in a marker portion of the image file,
the method comprising:
a sorting keyword extracting step of
recognizing the type of border line including solid line and broken line drawn in the marker portion of the image file read by the image reading unit, and
extracting the type of border line as a sorting keyword;
a sorting destination deciding step of deciding the sorting destination of the image file by collating the sorting keyword extracted based on the type of border line at the sorting keyword extracting step with the sorting condition stored in the sorting condition storage unit;
an image file sorting step of sorting the image file into the sorting destination decided at the sorting destination deciding step; and
a sorting condition updating step of
detecting property information of the image file sorted into the sorting destination at the image file sorting step, and
when the detected property information is recognized as new property information, updating the sorting condition based on the new property information to store the sorting condition in the sorting condition storage unit;
wherein when the detected property information is recognized as new property information, automatically updating the sorting condition based on the new property information to store the sorting condition in the sorting condition storage unit.

2. The image file sorting method according to claim 1, wherein
the method further includes a coupling step of associating the sorting keyword extracted at the sorting keyword extracting step with the image file to store the sorting keyword in the storage unit.

3. The image file sorting method according to claim 1, wherein
the sorting keyword extracting step further includes a character recognizing step of recognizing a character in the marker portion and sets the character as the sorting keyword.

4. The image file sorting method according to claim 1, wherein
the sorting keyword extracting step further includes a color recognizing step of recognizing a color of the marker portion and sets the color as the sorting keyword.

5. The image file sorting method according to claim 1, wherein
the sorting keyword extracting step further includes a shape recognizing step of recognizing a shape of the marker portion and sets the shape as the sorting keyword.

6. The image file sorting method according to claim 1, wherein
the sorting keyword extracting step further includes a coordinate recognizing step of recognizing a coordinate of the marker portion on the image file and sets the coordinate as the sorting keyword.

7. The image file sorting method according to claim 1, wherein
the sorting condition storage unit further stores, as the sorting condition, property information, a character, a color, a shape or a coordinate associated with the sorting destination.

8. An image file sorting device, comprising:
a storage unit, a control unit, and an image reading unit, wherein
the storage unit includes a sorting condition storage unit for storing, as a sorting condition to specify a sorting destination of an image file, a type of border line including solid line and broken line drawn in a marker portion of the image file, and
the control unit includes:
a sorting keyword extracting unit for
recognizing the type of border line including solid line and broken line drawn in the marker portion of the image file read by the image reading unit, and
extracting the type of border line as a sorting keyword;
a sorting destination deciding unit for deciding the sorting destination of the image file by collating the sorting keyword extracted based on the type of border line by the sorting keyword extracting unit with the sorting condition stored in the sorting condition storage unit;
an image file sorting unit for sorting the image file into the sorting destination decided by the sorting destination deciding unit; and
a sorting condition updating unit for detecting property information of the image file sorted into the sorting destination by the image file sorting unit, and
when the detected property information is recognized as new property information, updating the sorting condition based on the new property information to store the sorting condition in the sorting condition storage unit;
wherein the device is configured such that when the detected property information is recognized as new property information, automatically updating the sorting condition based on the new property information to store the sorting condition in the sorting condition storage unit.

9. The image file sorting device according to claim 8, wherein
the control unit further includes a coupling unit for associating the sorting keyword extracted by the sorting keyword extracting unit with the image file to store the sorting keyword in the storage unit.

10. The image file sorting device according to claim 8, wherein
the sorting keyword extracting unit further includes a character recognizing unit for recognizing a character in the marker portion and setting the character as the sorting keyword.

11. The image file sorting device according to claim 8, wherein
the sorting keyword extracting unit further includes a color recognizing unit for recognizing a color of the marker portion and setting the color as the sorting keyword.

12. The image file sorting device according to claim 8, wherein
the sorting keyword extracting unit further includes a shape recognizing unit for recognizing a shape of the marker portion and setting the shape as the sorting keyword.

13. The image file sorting device according to claim 8, wherein
the sorting keyword extracting unit further includes a coordinate recognizing unit for recognizing a coordinate of the marker portion on the image file and setting the coordinate as the sorting keyword.

14. The image file sorting device according to claim 8, wherein
the sorting condition storage unit is arranged to further store, as the sorting condition, property information, a character, a color, a shape or a coordinate associated with the sorting destination.

15. A computer program product, comprising a non-transitory computer readable medium including programmed instructions for causing, when executed by an image file sorting device, the image file sorting device to execute an image file sorting method, wherein
the image file sorting device includes a storage unit, a control unit, and an image reading unit,
the storage unit includes a sorting condition storage unit storing, as a sorting condition to specify a sorting destination of an image file, a type of border line including solid line and broken line drawn in a marker portion of the image file, and the method includes:
a sorting keyword extracting step of
recognizing the type of border line including solid line and broken line drawn in the marker portion of the image file read by the image reading unit, and
extracting the type of border line as a sorting keyword;
a sorting destination deciding step of deciding the sorting destination of the image file by collating the sorting keyword extracted based on the type of border line at the sorting keyword extracting step with the sorting condition stored in the sorting condition storage unit;
an image file sorting step of sorting the image file into the sorting destination decided at the sorting destination deciding step; and
a sorting condition updating step of
detecting property information of the image file sorted into the sorting destination at the image file sorting step, and
when the detected property information is recognized as new property information, updating the sorting condition based on the new property information to store the sorting condition in the sorting condition storage unit;
wherein when the detected property information is recognized as new property information, automatically updating the sorting condition based on the new property information to store the sorting condition in the sorting condition storage unit.

\* \* \* \* \*